P. A. ANDERSON.
AIR VALVE FOR CARBURETERS.
APPLICATION FILED JAN. 23, 1917.
1,376,063.
Patented Apr. 26, 1921.
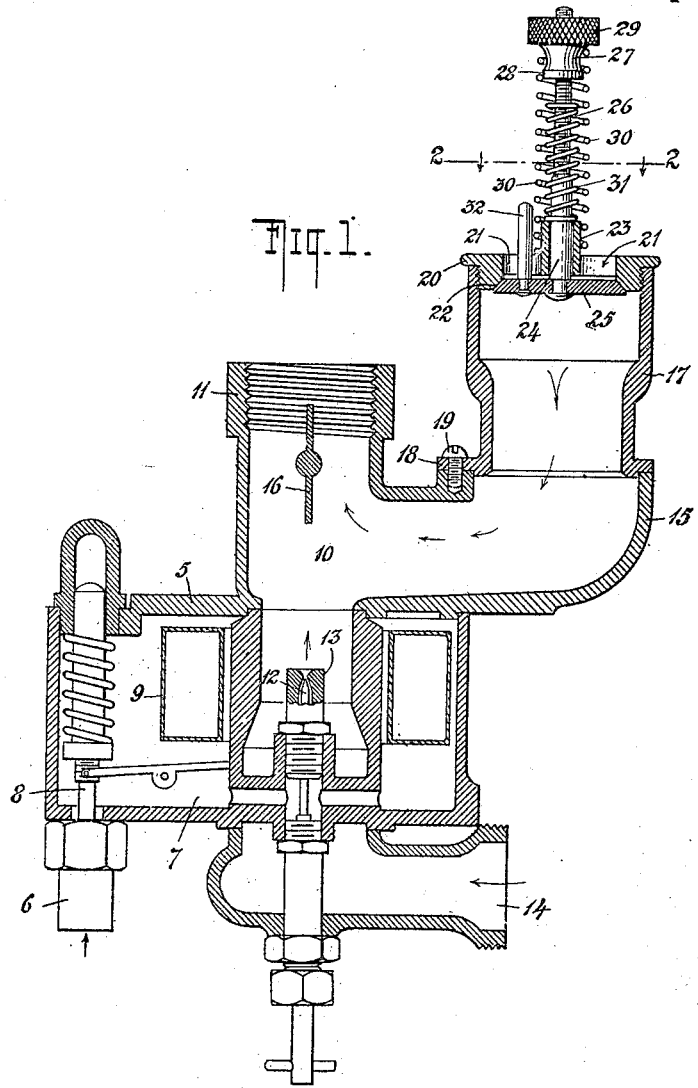
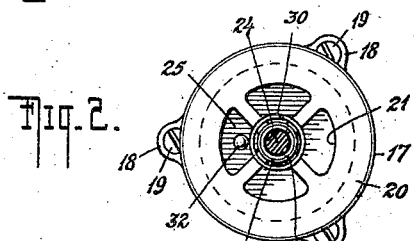
WITNESSES
INVENTOR
Per August Anderson
BY
ATTORNEYS

UNITED STATES PATENT OFFICE.

PER AUGUST ANDERSON, OF NEW YORK, N. Y.

AIR-VALVE FOR CARBURETERS.

1,376,063.  Specification of Letters Patent.  Patented Apr. 26, 1921.

Application filed January 23, 1917. Serial No. 143,944.

*To all whom it may concern:*

Be it known that I, PER AUGUST ANDERSON, a citizen of the United States, and resident of the borough of Manhattan, city, county, and State of New York, have invented certain new and useful Improvements in Air-Valves for Carbureters, of which the following is a specification.

My invention relates to air valves for carbureters and has for its object to provide a simple arrangement adapted more particularly for efficiently controlling the auxiliary air inlet of carbureters. My improvement further contemplates a construction in which the valve may be readily regulated to produce results of maximum efficiency in the carbureter under all atmospheric conditions and with gasolene of different qualities. A further purpose of my invention is to provide an arrangement in which the parts are readily accessible when operatively combined with the carbureter and in which all of said parts are combined in the form of a unit which is easily connected with and disconnected from the carbureter. Other objects of my improvement will appear from the description hereinafter and the features of novelty thereof will be pointed out in the appended claim.

Reference is to be had to the accompanying drawing which illustrates an example of my invention operatively combined with a carbureter of conventional design and in which Figure 1 is a vertical section of a carbureter and my improvement and Fig. 2 is a horizontal section on the line 2—2 of Fig. 1.

As shown in the illustrated example the carbureter comprises the usual casing 5 having the customary gasolene inlet 6 which may be connected with a source of gasolene in any well known and customary manner, and which leads to the float chamber 7, the said inlet 6 being controlled as usual by means of a valve 8 operatively connected with the float 9. The illustrated carbureter further includes a mixing chamber 10 communicating with an outlet 11 which is adapted for connection with the engine in any well known manner, a needle valve 12 coöperating with a spraying nozzle 13 to control the communication between the float chamber 7 and the mixing chamber 10 as shown in Fig. 1. In addition the carbureter comprises the usual primary air inlet 14 and auxiliary air inlet 15 leading to the mixing chamber and further is provided with the customary throttle disk 16 located between the mixing chamber 10 and outlet 11 and operated in the well known way. The parts so far described are those customarily included in carbureters and may be of any well known type, it being understood that any additional parts not shown and described which ordinarily form a part of such carbureters may be included if desired, the type or construction of the carbureter having nothing to do with my invention. In other words the latter is adapted to be operatively combined with carbureters, the specific construction of which may be entirely different from that shown and described.

My improvement comprises a tubular shell 17 provided at intervals with lugs 18 apertured to accommodate screws or other fastening devices 19 whereby said shell is operatively combined with the carbureter the illustration showing said shell 17 connected with the auxiliary air inlet 15 so as to form a continuation thereof. At its upper end the shell 17 is internally screw-threaded to accommodate an externally screw-threaded cap 20 having air inlets 21 and formed at its inner end with a valve seat 22 the latter being thus located between the ends of said shell 17. The said cap 20 is also provided with an axial sleeve 23 which forms a bearing for the valve stem 24 slidable therein and carrying a valve 25 at its inner end, the valve 25 coöperating with the seat 22 to control the communication between the shell 17 and the air inlets 21. At its outer end portion the stem 24 is screw-threaded as indicated at 26 for the accommodation of an adjusting nut 27, the latter having a reduced portion 28 and an enlarged preferably knurled operating head 29. The head 29 forms an abutment for one end of an outer and relatively light coil spring 30 which surrounds the stem 24 and has its other end resting upon or in engagement with the cap 20. A second or inner coil spring 31 relatively heavier than the spring 30 surrounds said stem 24 within the spring 30 and rests upon the free end of the sleeve 23 the heavier spring 31 in the illustrated adjustment of the parts as shown in Fig. 1 terminating at a distance below and in the path of the portion 28 of the adjusting nut 27. In addition to the above the construction may include a pin 32 carried by the valve 25 and extending outwardly through one of the air inlets 21, said pin 32 in combination with the walls of said air inlet serving to limit the rotation of the valve 25 under the conditions to be more fully explained hereinafter.

In operation the suction produced in the mixing chamber 10 by the engine or motor as it operates brings about an operation of the carbureter in the usual manner and at the same time causes the valve 25 to move inwardly away from the seat 22 thus admitting auxiliary air to said mixing chamber 10 as will be readily apparent and providing the desired explosive mixture for delivery to the engine or motor. As long as the latter is operating at low speed, and assuming the parts of my improved valve structure to be in the positions shown in Fig. 1, the valve 25 will be operated as described only against the tension of the weaker spring 30, the movement of said valve in this case being insufficient to bring the portion 28 of the nut 27 into engagement with the relatively heavier spring 31. If the suction effect increases due to increased speed of the motor or engine, the valve 25 will be moved away from the seat 22 to a greater extent and finally to such a degree as to bring the portion 28 of the nut 27 into contact with the end of the heavier spring 31. If the movement of the valve 25 away from its seat 22 is sufficiently great this heavier spring 31 will also be compressed and will thus add the force of its tension to that of the lighter spring 30 as a resistance to the opening of said valve. In other words, in this case, the tension tending to resist the opening of said valve is increased with the result that the admission of too great an amount of air and the consequent formation of a poor mixture for the intended purpose is prevented and a mixture rich in gasolene and particularly adapted for high speed or other special conditions is always automatically provided.

The tension of the spring 30 may be changed by simply adjusting the position of the nut 27 upon the screw-threaded portion 26 of the stem 24 as will be readily apparent. The adjustment of the nut 27 to increase the tension of the outer spring 30 decreases the distance between the portion 28 and the end of the inner spring 31 and in some cases may be such as to effect and increase the tension of the latter spring. In all instances an adjustment may readily be had to efficiently meet the conditions imposed by the particular atmospheric condition existing at the time or by the quality of gasolene being used or by both of these factors. As the location of the adjusting nut 27 and connected parts is such as to make these elements readily accessible the necessary adjustments may be easily and quickly made as often as required with a minimum of effort and trouble. A mixture best suited to all conditions and neither too rich nor too weak is thus always obtainable in a simple manner whereby explosions of maximum power are obtained with the result that the motor or engine operates with a maximum of efficiency under all atmospheric conditions and regardless of the quality of the gasolene being used.

As the adjustment above mentioned takes place the rotation of the nut 27 may at times be communicated for instance to the spring 30 and in turn may thus tend to rotate the valve 25 on its axis. Any such rotation of said valve is arrested by the pin 32 in coöperation with the walls of the air inlet 21 through which it passes, so that whatever rotation of the valve may take place, the extent thereof will never be greater than the width of said air inlet at the point where the pin 32 is located.

Furthermore by combining the shell 17, valve 25, valve seat 22 and adjusting mechanism for instance as shown in the illustrated example these elements may be readily connected with and disconnected from the carbureter as a unit and without necessitating individual manipulation of any of such elements or their disconnection from each other as has heretofore been necessary. In addition to this the valve seat 22 with the valve 25 may be readily disconnected from the shell 17 and the valve parts and ring 20 in turn easily disassembled when for any reason this may be necessary. Cleaning, replacing and renewing of these parts as well as refinishing and regrinding of the valve and valve seat may thus be accomplished with a minimum of difficulty and without disturbing any of the other parts of the valve structure or of the carbureter.

My improvement may be readily adapted for use with any type of carbureter, either of existing constructions or of special make and is at all times simple and efficient in operation and not likely to get out of order. My invention is also extremely simple in construction and easy to produce whereby the cost of manufacture is reduced to a minimum and furthermore requires no complicated adjustment to insure satisfactory operation.

Various changes may be made in the form shown and described within the scope of the claim without departing from the spirit of my invention.

I claim:

The combination of a tubular shell, means at one end of said shell whereby it may be detachably connected with a carbureter, a cap in screw-threaded engagement with the opposite end of said shell, a relatively reduced sleeve extending axially from said cap, the latter having a plurality of air inlets surrounding said sleeve and extending through said cap in an axial direction, a valve seat on said cap, a single valve coöperating with said seat to control all of said air inlets, a slidable stem connected with said valve and extending through and beyond said sleeve, the outer end portion of said stem being screw-threaded, a pair of springs of different tensions surrounding said stem and engaging said cap and sleeve respectively, a screw-threaded member adjustably mounted upon the screw-threaded portion of said stem whereby the tension of both springs may be adjusted and a pin carried by said valve and extending through one of said air inlets and arranged, by contact with the walls thereof to limit the rotative movements of said valve.

In testimony whereof I have hereunto set my hand.

PER AUGUST ANDERSON.